US007651309B2

(12) United States Patent
Ikehata et al.

(10) Patent No.: US 7,651,309 B2
(45) Date of Patent: Jan. 26, 2010

(54) FLOATING UNIT, AND AN ARTICLE SUPPORT APPARATUS HAVING FLOATING UNITS

(75) Inventors: Yoshiteru Ikehata, Yasu (JP); Shigeto Murayama, Hikone (JP); Takayoshi Ono, Tainan (TW); Tatsuhisa Tsuji, Tainan (TW)

(73) Assignee: Daifuku Co., Ltd., Osaka (JP)

( * ) Notice: Subject to any disclaimer, the term of this patent is extended or adjusted under 35 U.S.C. 154(b) by 721 days.

(21) Appl. No.: 11/503,510

(22) Filed: Aug. 11, 2006

(65) Prior Publication Data

US 2007/0041813 A1 Feb. 22, 2007

(30) Foreign Application Priority Data

Aug. 16, 2005 (JP) ............................. 2005-236019
Dec. 16, 2005 (JP) ............................. 2005-363176

(51) Int. Cl.
*B65G 49/06* (2006.01)
(52) U.S. Cl. ...................................... 414/277
(58) Field of Classification Search ................ 414/266, 414/277, 286
See application file for complete search history.

(56) References Cited

U.S. PATENT DOCUMENTS 4,782,327 A * 11/1988 Kley et al. ...................... 341/2

4,838,172 A * 6/1989 Morishita et al. ........... 104/281
5,415,589 A * 5/1995 Hall, Jr. ........................ 472/25
5,846,212 A * 12/1998 Beeuwkes et al. ............. 601/38
6,583,597 B2 * 6/2003 Tanaka et al. ............... 318/687

FOREIGN PATENT DOCUMENTS

JP    2001-002213    9/2001

\* cited by examiner

*Primary Examiner*—Charles A Fox
(74) *Attorney, Agent, or Firm*—The Webb Law Firm

(57) ABSTRACT

A floating unit comprises: a stationary portion; a movable portion supported to be movable relative to the stationary portion and including an article support; a support disposed between the stationary portion and the movable portion, the support having a plurality of rolling elements rotatably held by a holder between an upwardly facing first contact surface provided on the stationary portion and a downwardly facing second contact surface provided on the movable portion, whereby the support is movable in all horizontal directions relative to the movable portion and the stationary portion; a movable portion returning device for biasing the movable portion relative to the stationary portion toward a reference position for receiving an article; and a support returning device for biasing the support horizontally relative to the stationary portion toward a reference position for holding the movable portion.

20 Claims, 14 Drawing Sheets

FIG.11
(a)
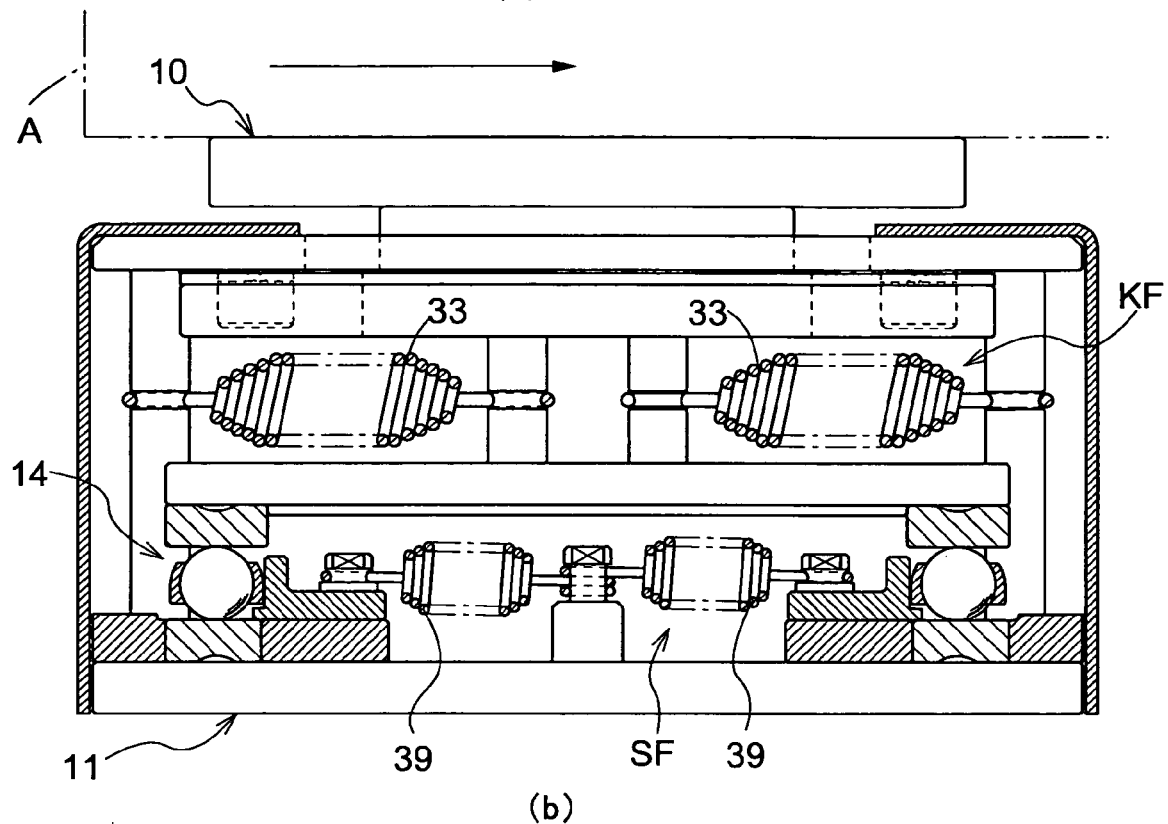
(b)
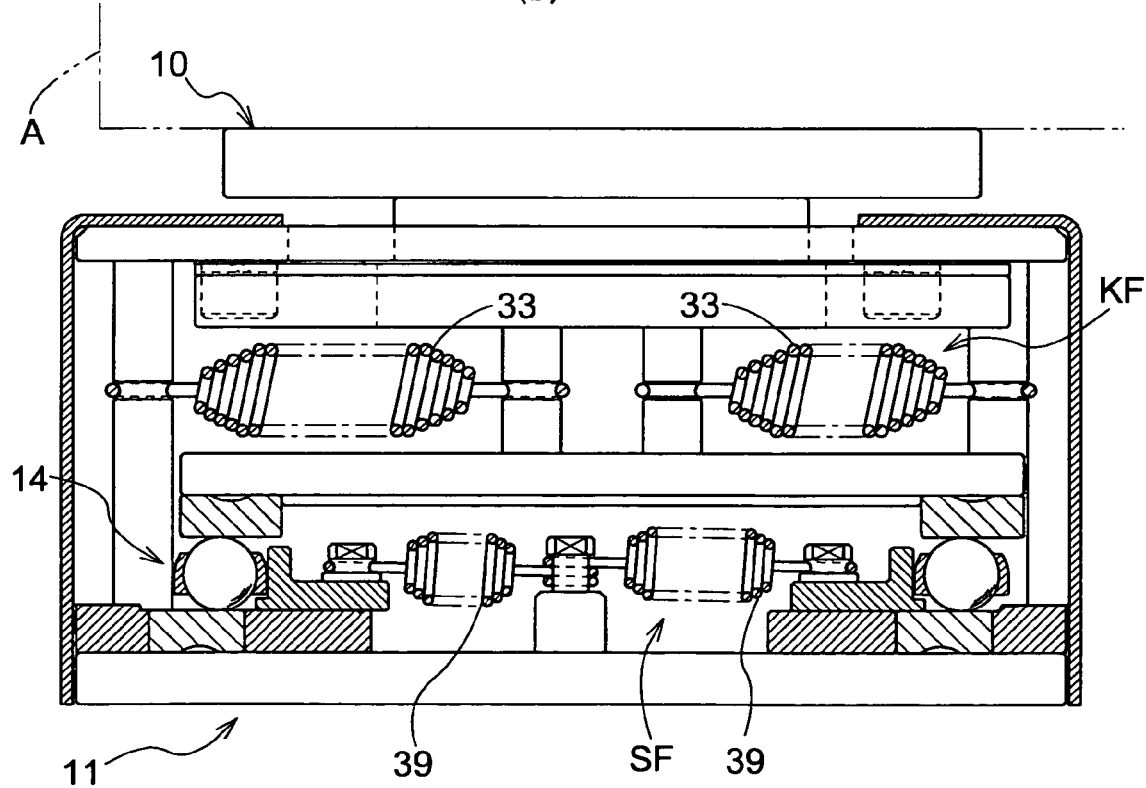

FLOATING UNIT, AND AN ARTICLE SUPPORT APPARATUS HAVING FLOATING UNITS

BACKGROUND OF THE INVENTION

This invention relates to a floating unit including a movable portion an article support and supported through a rolling type support to movable in all horizontal directions relative to a stationary portion, and movable portion returning means for moving the movable portion relative to the stationary portion back to a reference position for receiving an article, wherein the rolling type support has a plurality of rolling elements rotatably held by a holder between an upwardly facing first contact surface provided on the stationary portion and a downwardly facing second contact surface provided on the movable portion, whereby the support is movable in all horizontal directions relative to the movable portion and the stationary portion. The invention relates also to an article support apparatus having such floating units.

The above floating unit is mainly used in an article support apparatus for horizontally movably supporting an article, and horizontally positioning the article in a reference position for transfer. That is, the article support apparatus includes a pair of right and left elongate frames extending parallel to each other for receiving and supporting the article. Each of the frames has a plurality of such floating units arranged longitudinally thereof. A positioning device is provided for moving to the reference position for transfer the article supported by the plurality of floating units arranged on each of the pair of frames. Through a space between the pair of frames, a fork-type article transfer device, for example, puts an article on the pair of frames, and takes out the article placed on the frames. The positioning device positions the article placed on the frames to the reference position for transfer.

This article support apparatus is used in various forms. The apparatus will be described taking for example the case of storing an article supplied from outside in a warehouse. When the fork-type article transfer device supplies the article from outside to the pair of frames in the article support apparatus, the positioning device is operated to position the article in the reference position for transfer. Next, with the positioning action canceled, an article transfer device of the warehouse takes the article from the pair of frames in the article support apparatus, and stores it in the warehouse. In order to retain the article reliably in the reference position for transfer when the positioning action of the positioning device has been canceled, a retaining device may be provided for retaining the movable portion of each floating unit in the position established by the positioning device.

That is, after the article is supplied to the article support apparatus and the positioning device is operated to position the article in the reference position for transfer, the retaining device is operated to retain the movable portion of each floating unit in the position established by the positioning device. When the article transfer device of the warehouse takes the article from the article support apparatus after the positioning action of the positioning device is canceled, the movable portion of each floating unit is retained by the retaining device in the position for transfer set by the positioning device. After the takeout of the article is completed, the position retaining action of the retaining device is canceled. Then, the movable portion is moved by the movable portion return device back to the reference position for receiving an article. The movable portion can properly receive and support a next article supplied to the article support apparatus.

In another form of use, the article support apparatus may be used where an article is a storage cassette holding a plurality of plate-like objects such as glass plates. The plate-like objects stored in the storage cassette are supplied to processing equipment for processing the plate-like objects. This example will be described hereinafter. The article support apparatus is installed as corresponding to the processing equipment for processing the plate-like objects. The storage cassette is supplied from outside to the pair of frames in the article support apparatus using a fork-type article transfer device, for example. Next, the positioning device is operated to position the storage cassette in the reference position for transfer. In this state, a plate-like object transfer device of the processing equipment takes the plate-like objects successively from the storage cassette, and supplies the objects to the processing equipment. The storage cassette from which the plate-like objects have been taken may be transported after the plate-like objects are returned from the processing equipment, or may be transported in a state of being empty of plate-like objects. In either case, when transporting the storage cassette, the positioning action of the positioning device is canceled first. The movable portion retaining device moves the movable portion of each floating unit back to the reference position for receiving an article. Then, the fork-type article transfer device returns the storage cassette to the position to which the cassette was supplied from outside. In the state, the fork-type article transfer device takes out the article placed on the pair of frames in the article support apparatus.

The floating units used in the article support apparatus will be described further. When the positioning device moves the article horizontally in order to move the horizontal position of the article to the reference position for transfer, the movable portion moves horizontally from the reference position for receiving an article, and the rolling type support also moves horizontally by rolling of the rolling elements. When the movable portion is moved by the movable portion returning means back to the reference position for receiving an article, the rolling type support also returns to a reference position for holding the movable portion by rolling of the rolling elements, with the movement of the movable portion. The reference position for holding the movable portion is set to a position where the annular rolling type support is substantially concentric with the disk-shaped movable portion in the reference position for receiving an article (see Japanese Patent Publication No. 2001-2213, for example).

However, in the conventional construction described above, the rolling type support returns to the reference position for holding the movable portion by rolling of the rolling elements, with movement of the movable portion. When the movable portion returning means returns the movable portion to the reference position for receiving an article, slips can occur between the rolling elements of the rolling type support and the rolling element contact surface of the movable portion or the rolling element contact surface of the stationary portion. Consequently, although the movable portion has returned to the reference position for receiving an article, the rolling type support may not be returned properly to the reference position for holding the movable portion.

The rolling type support, when located in the reference position for holding the movable portion, is set to be capable of guiding the movable portion to move substantially the same distance in all horizontal directions. Unless the rolling type support can be returned properly to the reference position for holding the movable portion, an inconvenience occurs that the distance the movable portion can be moved is different for different horizontal directions.

The conventional article support apparatus with the floating units having the construction described above has a disadvantage of failing to move properly an article placed thereon to the reference position for transfer.

SUMMARY OF THE INVENTION

The object of this invention is to provide a floating unit capable of uniformly moving a movable portion in all horizontal directions, and an article support apparatus capable of moving an article placed thereon to a reference position for transfer by using such floating units.

The above object is fulfilled, according to this invention, by a floating unit comprises, a stationary portion, a movable portion supported to be movable relative to the stationary portion and including an article support, a support disposed between the stationary portion and the movable portion, the support having a plurality of rolling elements rotatably held by a holder between an upwardly facing first contact surface provided on the stationary portion and a downwardly facing second contact surface provided on the movable portion, whereby the support is movable in all horizontal directions relative to the movable portion and the stationary portion, a movable portion returning device for biasing the movable portion relative to the stationary portion toward a reference position for receiving an article; and, support returning means for biasing the support horizontally relative to the stationary portion toward a reference position for holding the movable portion.

The rolling type support returns to the reference position for holding the movable portion as above. Thus, when an article supported is moved horizontally and the movable portion moves horizontally with the movement of the article, the movable portion can be moved over substantially the same range in all horizontal directions.

Thus, the floating unit according to this invention is capable of uniformly moving the movable portion in all horizontal directions.

BRIEF DESCRIPTION OF THE DRAWINGS

FIG. 11 is an explanatory view showing movement of the floating unit.

DETAILED DESCRIPTION OF PREFERRED EMBODIMENTS

While a plurality of embodiments of this invention are described hereinafter, a combination of the characteristic features of one embodiment different from the characteristic features of the other embodiments is also included in the scope of this invention in the absence of a conflict. For example, some returning devices are described in different embodiments. It is possible for one floating unit to include two returning devices disclosed in two different embodiments and having the same functions.

First Embodiment

A first embodiment of this invention will be described hereinafter with reference to the drawings. In this embodiment, floating units and an article support apparatus having the floating units according to this invention are applied to an automatic warehouse system.

Figure 1:
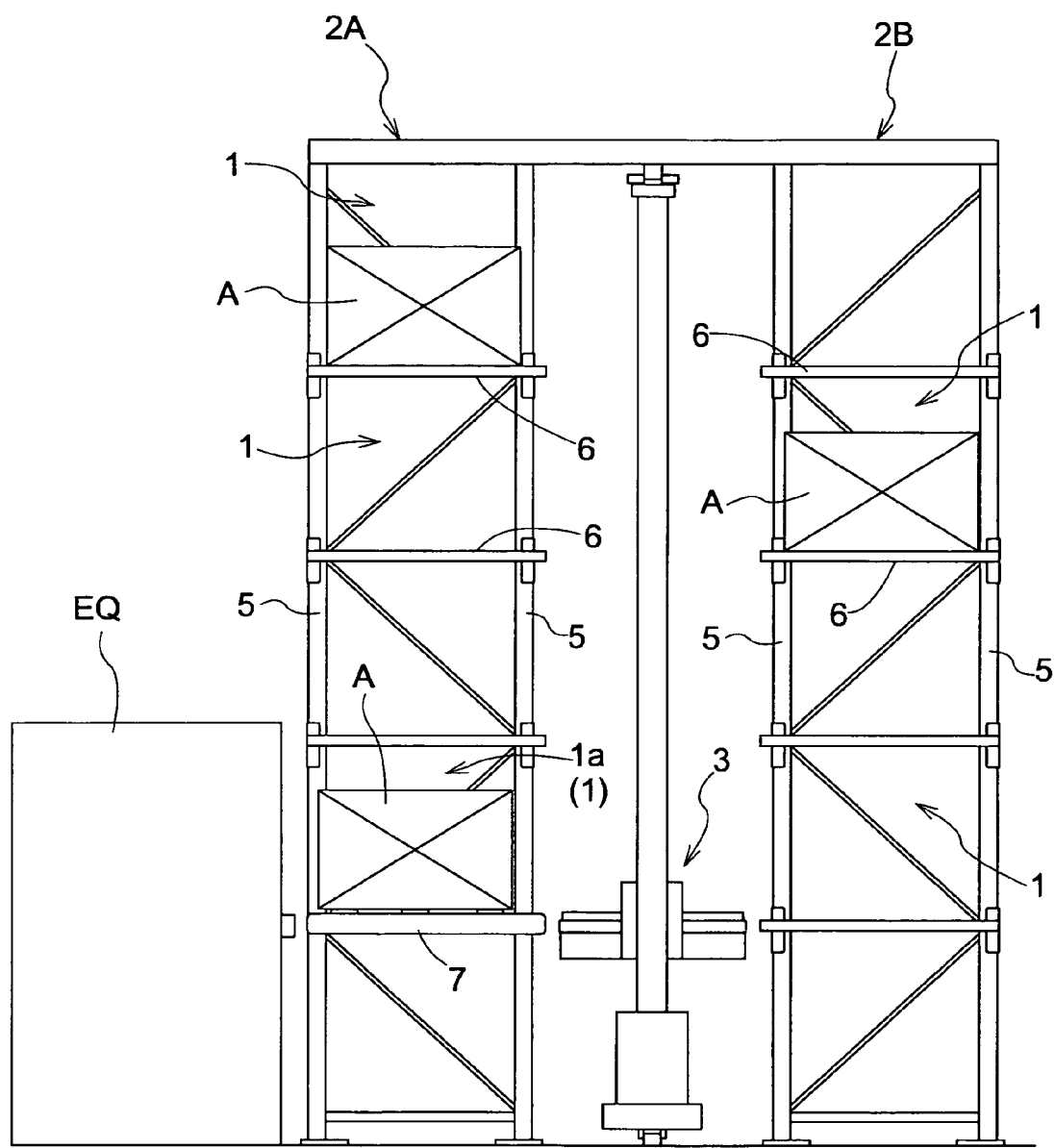
FIG. 1 is a front view of an automatic warehouse system.
Figure 2:
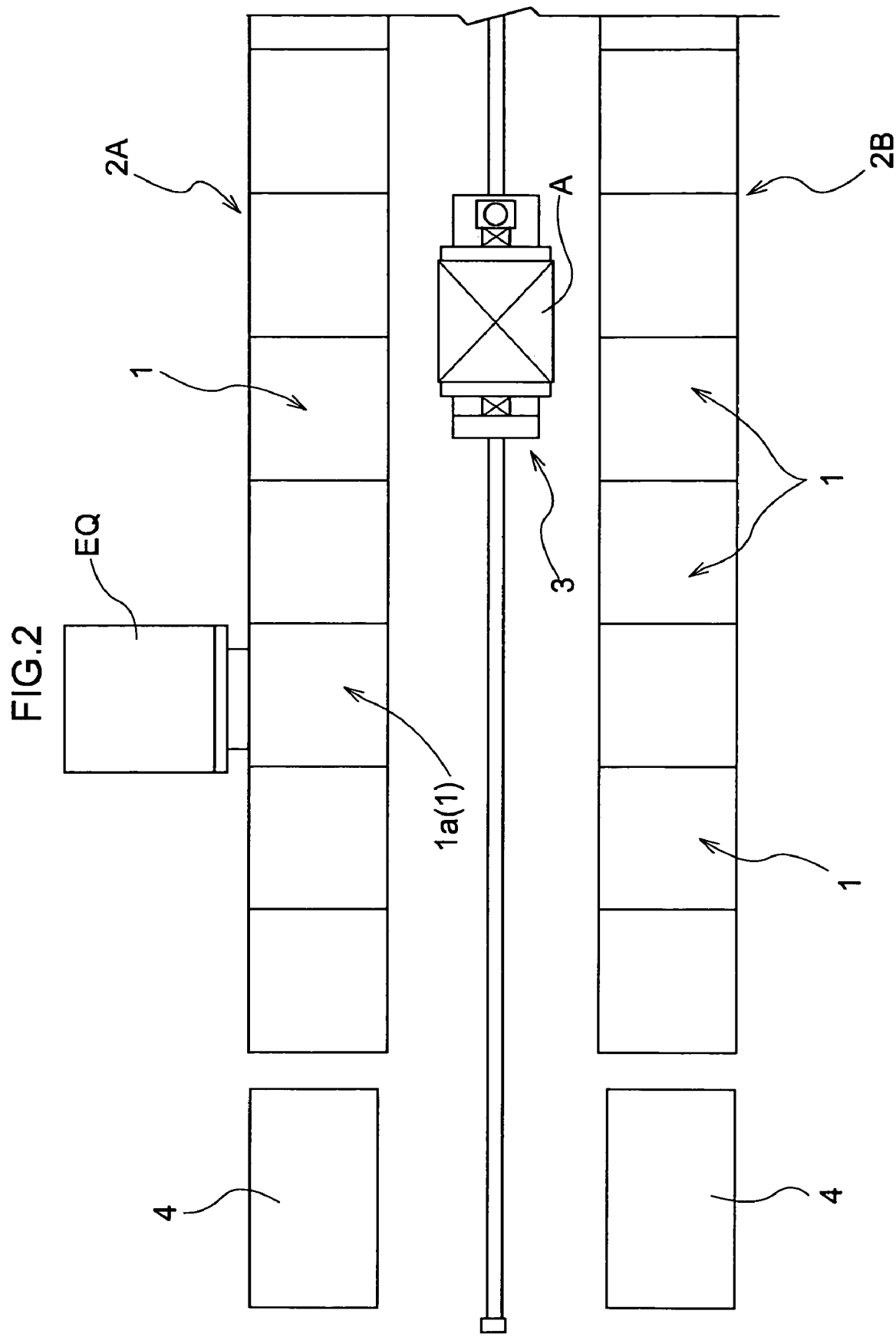
FIG. 2 is a plan view of the automatic warehouse system.

As shown in FIGS. 1 and 2, the automatic warehouse system includes a pair of storage racks 2A and 2B each having a plurality of article storage units 1 arranged vertically and horizontally for storing articles A. The storage racks 2A and 2B are arranged forward and backward with a predetermined interval in between. Each article storage unit 1 stores an article A which, for example, is a storage cassette transported as containing a plurality of plate-like objects such as liquid crystal displays or materials (e.g. glass plates) used therefor. Such an automatic warehouse system is installed in a cleanroom with little suspended particles of dust, for example.

A stacker crane 3 is disposed between the front and rear storage racks 2A and 2B for accessing each article storage unit 1. The stacker crane 3 performs loading and unloading operations to transport an article A from an article reception and delivery station 4 to one of the article storage units 1, and to transport an article A from an article storage unit 1 to the or a different article reception and delivery station 4. That is, the stacker crane 3 has a fork-type article transfer device to operate in the warehouse for transferring articles to and from the article reception and delivery stations 4 and article storage units 1.

Processing equipment EQ is provided for one article storage unit 1a among the plurality of article storage units 1 in the storage racks 2A and 2B, and is located at an opposite side to where the stacker crane 3 is located. The processing equipment EQ takes only the plate-like objects out of the storage cassette of the article A stored in an article storage unit 1. Although this processing equipment EQ is not described in detail herein, it carries out production processes such as manufacturing processes or inspection processes, for example, for the plate-like objects taken out.

Figure 3:
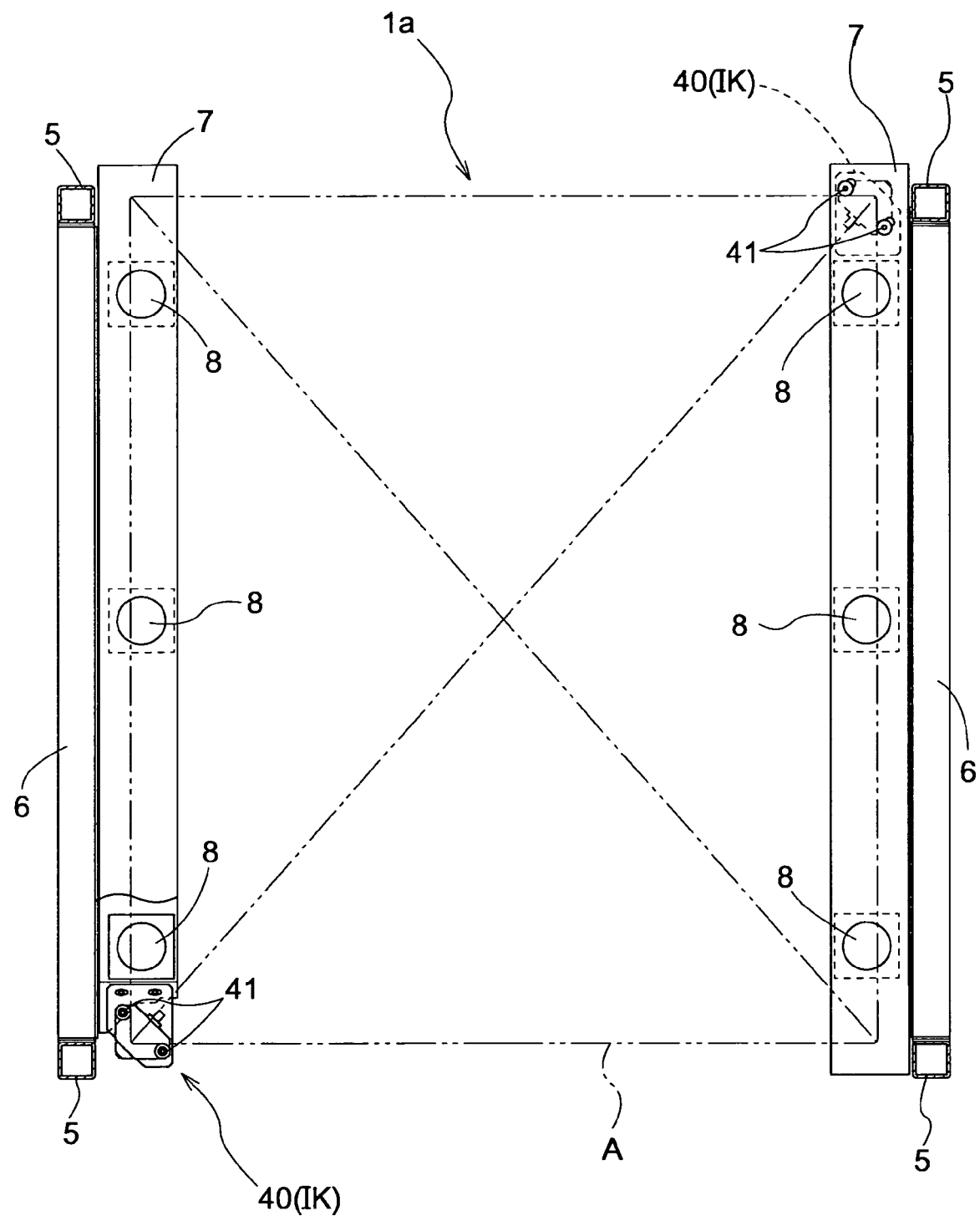
FIG. 3 is a plan view of a takeout article storage unit.
Figure 4:
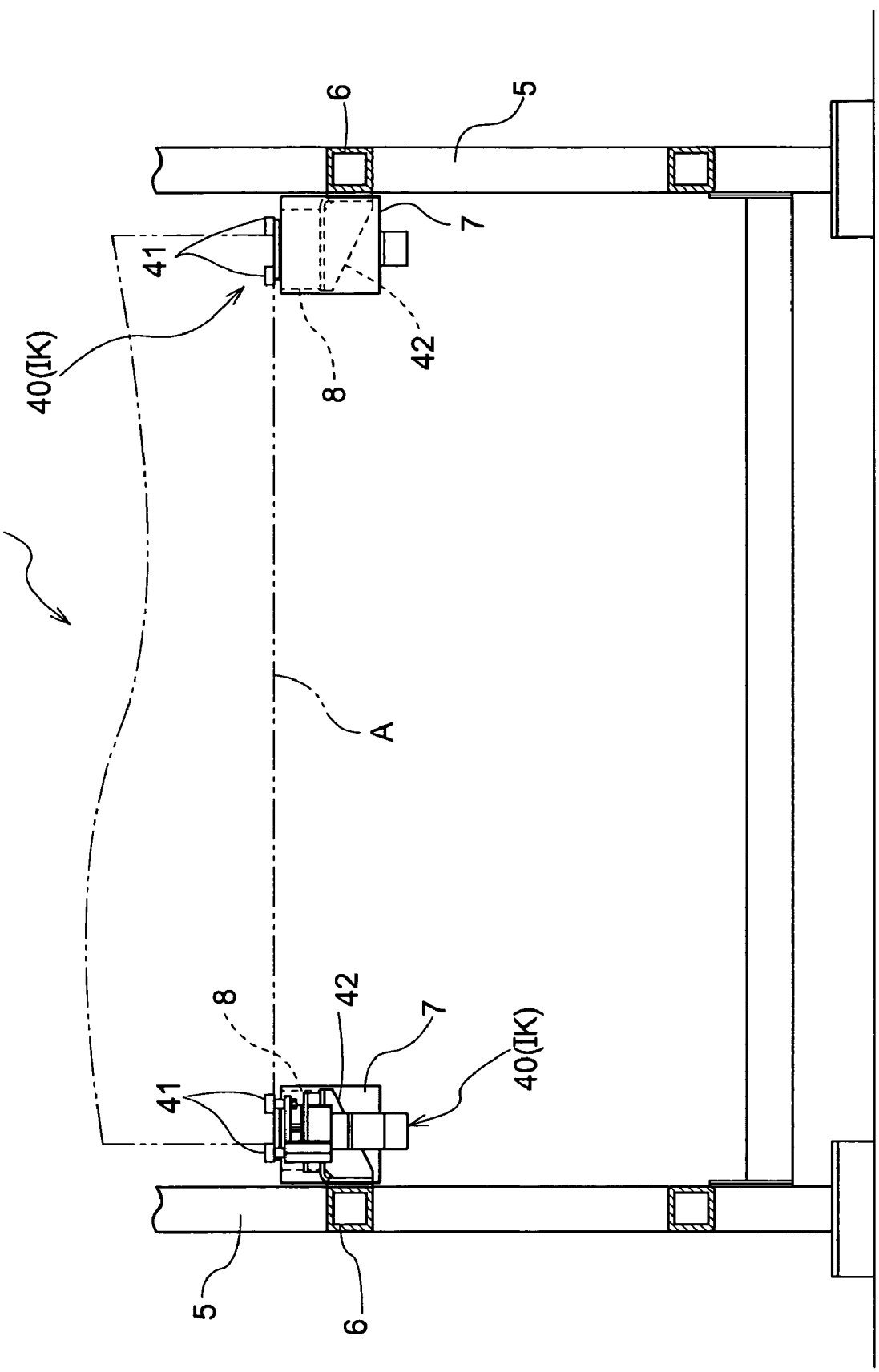
FIG. 4 is a side view of the takeout article storage unit.

Each of the article storage racks 2A and 2B has a plurality of vertical struts 5 connected to transverse frames 6. The plurality of article storage units 1 are defined by internal spaces surrounded by these struts 5 and transverse frames 6. The article storage unit 1a (hereinafter called the takeout article storage unit) from which the plate-like objects are taken by the processing equipment EQ, as shown in FIGS. 3 and 4, has four struts 5 located in the four corners of the space for storing an article A, and transverse frames 6 each extending between the pair of front and rear struts 5 arranged at one side. A pair of right and left elongate frames 42 (FIG. 4) are fixedly attached to the transverse frames 6 for supporting the article A. The frames 42 are enclosed over an entire length thereof in casings 7 having a substantially square pipe shape. Each of the article storage units 1 other than the takeout article storage unit 1a in the storage racks 2A and 2B, also has four struts 5 located in the four corners of the space for storing an article A, and article-supporting frames similar to the elongate frames 42 each extending between the pair of front and rear struts 5 arranged at one side.

Each of the right and left elongate frames 42 has a plurality of floating units 8 for receiving and supporting the article A carried in by the stacker crane 3, to be movable over an entire horizontal range. That is, the pair of elongate frames 42, respectively, have a total of six floating units 8, i.e. three each at the right and left sides, arranged at intervals longitudinally of the frames 42. Large parts of the floating units 8 are contained in the casings 7 (see FIG. 4).

In this embodiment, therefore, one of the article storage units 1 of the storage rack 2A in the automatic warehouse system includes an article support apparatus having the floating units 8.

Figure 5:
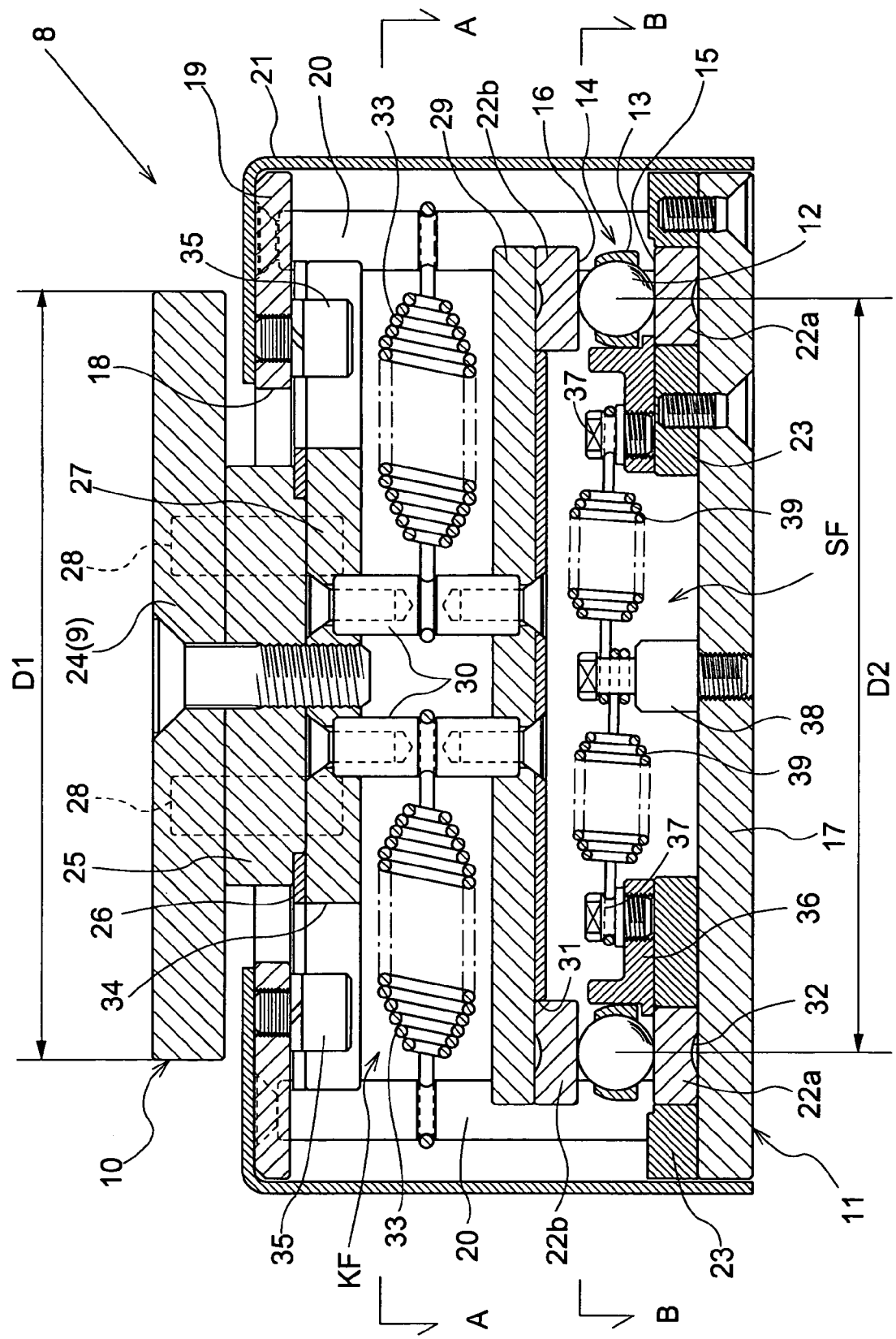
FIG. 5 is a side view in vertical section of a floating unit.

As shown in FIG. 5, each floating unit 8 includes a movable portion 10 having an article support 9 and held and supported by a stationary portion 11 through a rolling type support 14 to be movable in all horizontal directions and rotatable in plan view. The rolling type support 14 has a plurality of rolling elements 12 rotatably held by a holder 13. A movable portion returning device KF is provided for horizontally moving the movable portion 10 relative to the stationary portion 11, back to a reference position for receiving an article. With the rolling elements 12 arranged between an upwardly directed, flat rolling element contact surface 15 provided on the stationary portion 11 and a downwardly directed, flat rolling element contact surface 16 provided on the movable portion 10, the rolling type support 14 is movable in all horizontal directions relative to the movable portion 10 and stationary portion 11.

The floating unit 8 includes support returning means SF for horizontally moving the rolling type support 14 relative to the stationary portion 11, back to a reference position for holding the movable portion 10. The movable portion returning device KF is constructed to rotate the movable portion 10 back to a particular rotational phase in the direction of rotation in plan view.

A specific construction of the floating unit 8 will be described hereinafter with reference to FIGS. 5 through 8.

Figure 8:
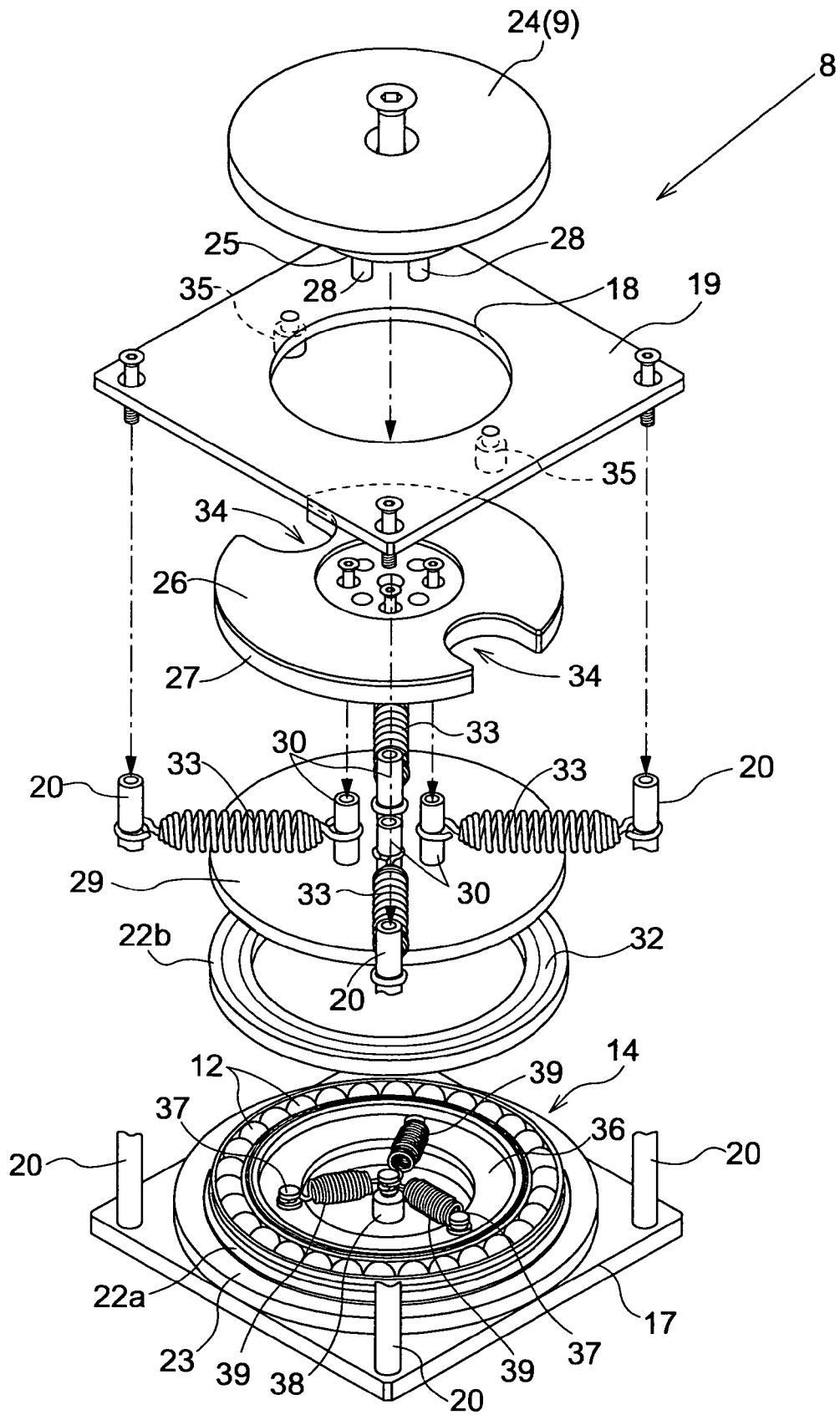
FIG. 8 is an exploded perspective view of the floating unit.

The construction of the stationary portion 11 will be described first. As shown in FIGS. 5 and 8, the stationary portion 11 includes a lower stationary plate 17 having a square shape in plan view, an upper stationary plate 19 having a square shape in plan view similar to the lower stationary plate 17 and having a circular receiving bore 18 formed centrally thereof, four stationary portion side posts 20 for fixedly connecting, through screw-thread engagement adjacent the four corners in plan view, the lower stationary plate 17 and upper stationary plate 19 with a vertical interval in between, a cover 21 bent to surround outer peripheries of the lower stationary plate 17 and upper stationary plate 19 and cover the top of the upper stationary plate 19, a stationary portion side contact surface forming member 22a shaped annular in plan view and defining the rolling element contact surface 15 of the stationary portion 11, and a roller holding member 23 fixedly screwed to the lower stationary plate 17 for positioning and holding the member 22a.

The construction of the movable portion 11 will be described next. A large part of the movable portion 10 is contained in a movable portion accommodating space defined by the lower stationary plate 17 and cover 21 of the stationary portion 11. Only the article support 9 is exposed upward and outward of the movable portion accommodating space. The lower end of the movable portion 10 is held and supported by the rolling type support 14 mounted in the movable portion accommodating space.

Specifically, as shown in FIGS. 5 and 8, the movable portion 11 includes a disk-shaped upper movable plate 24 acting as the article support 9, a disk-shaped small diameter plate 25 (second member) having a smaller diameter than the receiving bore 18 formed in the upper stationary plate 19, and two substantially disk-shaped lift preventing plates 26 and 27 located inside the movable portion accommodating space and having a larger diameter than the receiving bore 18 formed in the upper stationary plate 19. These plates 26 and 27 are stacked one upon the other and fastened together by bolts. In order to align these upper movable plate 24, small diameter plate 25 and two lift preventing plates 26 and 27 in a concentrically overlapping relationship, four positioning pins 28 are arranged in radially inward locations and equidistantly in the circumferential direction. The positioning pins 28 are axially fitted into these plates.

Figure 6:
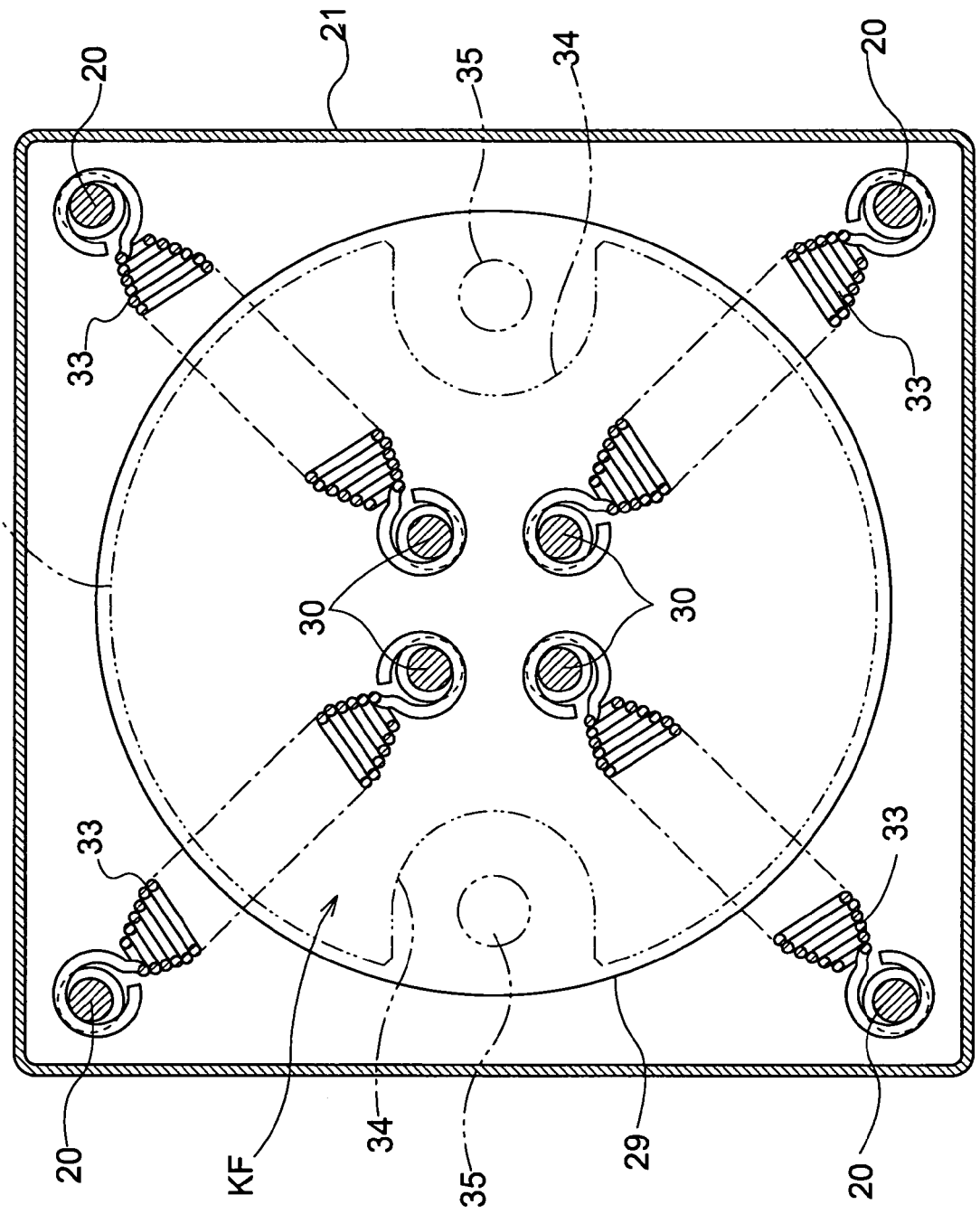
FIG. 6 is a section taken on line A-A of FIG. 5.

A disk-shaped lower movable plate 29 is disposed under the lift preventing plate 27. The lower movable plate 29 and lift preventing plate 27 are rigidly connected together by four movable portion side posts 30 fixed thereto by bolts. As shown in FIG. 6, the four movable portion side posts 30 are arranged equidistantly in the circumferential direction between the four positioning pins 28. On the lower surface of the lower movable plate 29, an annular movable portion side contact surface forming member 22b defining the rolling element contact surface 16 of the movable portion 10 is fitted on and fixed to a small diameter shoulder 31 formed on the lower movable plate 29.

Figure 7:
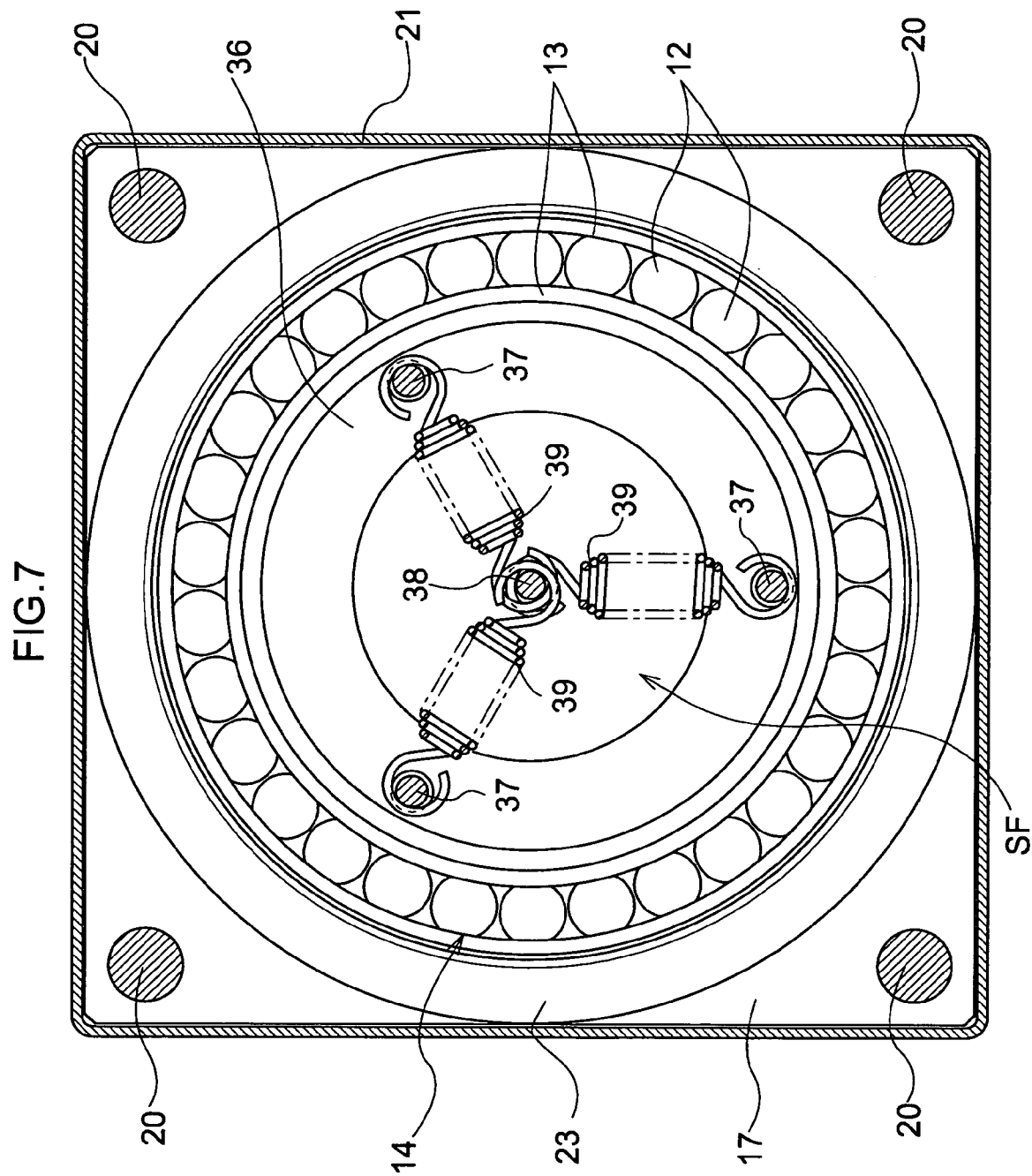
FIG. 7 is a section taken on line B-B of FIG. 5.

As also shown in FIG. 7, the rolling type support 14 has the plurality of rolling elements 12 in the form of steel balls arranged in a circle and rotatably held by the holder 13. This construction employs a plurality of steel balls of a commercially available, ordinary thrust bearing, and the holder 13 for holding these balls as arranged in a circle.

The stationary portion side contact surface forming member 22a defining the rolling element contact surface 15 of the stationary portion 11, and the movable portion side contact surface forming member 22b defining the rolling element contact surface 16 of the movable portion 10, are in the form of a pair of annular load bearing members of a thrust bearing.

That is, each of the load bearing members has an annular groove formed in one side thereof. An ordinary thrust bearing is usually used such that the pair of annular load bearing members hold therebetween the plurality of steel balls as fitted in the grooves to be capable only of rolling in the circumferential direction. However, this floating unit 8 uses, as the members defining the above rolling element contact surfaces 15 and 16, the pair of annular load bearing members inverted so that the plurality of rolling elements 12 contact flat surfaces reverse to the surfaces defining the steel ball receiving grooves. FIG. 8 shows an annular groove 32 formed in one of the load receiving members noted above.

Thus, the rolling type support 14 is movable in all horizontal directions relative to the movable portion 10 and stationary portion 11, with the plurality of rolling elements 12 arranged between the upwardly directed, flat rolling element contact surface 15 provided on the stationary portion 11 and the downwardly directed, flat rolling element contact surface 16 provided on the movable portion 10.

A movable portion returning device KF of the resiliently biasing type is provided for horizontally moving the movable portion 10 relative to the stationary portion 11, back to a reference position for receiving an article.

Specifically, four coil springs 33 are mounted to extend radially between the four stationary portion side posts 20 and four movable portion side posts 30, respectively. These four coil springs 33 constitute the movable portion returning device KF.

To describe this further, the four stationary portion side posts 20 are fixed to the stationary portion 11 as located in the four corners in an inner space, square shaped in plan view, and covered by the cover 21. The four movable portion side posts 30 are provided to correspond to the four stationary portion side posts 20, respectively. The four coil springs 33 are mounted to extend between the four stationary portion side posts 20 and four movable portion side posts 30, respectively. The four coil springs 33 impart resilient biasing forces to rotate the movable portion 10 back to a particular rotational phase in a direction of rotation in plan view.

Thus, when returning to the reference position for receiving an article the movable portion 10 having moved horizontally, e.g. having rotated from the particular rotational phase in plan view relative to the stationary portion 11, the movable portion 10 is rotated back to the above particular rotational phase by resilient biasing forces in pulling directions of the four coil springs 33.

When positioning means IK described hereinafter horizontally pushes an article A placed on the upper movable plate 24, the position of the movable portion 10 shifts horizontally from the reference position for receiving an article. After completion of the pushing operation of the positioning device IK, the resilient biasing forces of the coil springs 33 move the movable portion 10 back to the reference position for receiving an article. Further, a construction is provided to limit to a set range a distance of horizontal movement of the movable portion 10 from the reference position for receiving an article. That is, as shown in FIGS. 6 and 8, the lift preventing plates 26 and 27 have a pair of arcuate engaging recesses 34 indented radially inward in diametrically opposite positions thereof. On the other hand, the upper stationary plate 19 of the stationary portion 11 has engaging pins 35 for contacting inner edges of the engaging recesses 34 and preventing further movement of the movable portion 10 having moved a set distance horizontally from the reference position for receiving an article. Thus, the engaging pins 35 and the lift preventing plates 26 and 27 having the engaging recesses 34 formed therein limit to the set range the distance of horizontal movement of the movable portion 10 from the reference position for receiving an article.

Besides the movable portion returning device KF, support returning means SF of the resiliently biasing type is provided to return the rolling type support 14 relative to the stationary portion 11, to a reference position for holding the movable portion 10.

Specifically, as shown in FIGS. 5, 7 and 8, a connecting member 36 shaped annular in plan view is fitted on an inner circumferential edge of the annular holder 13 of the rolling type support 14. The connecting member 36 has three engaging pins 37 formed in positions at an equal distance from the center thereof and fixedly arranged equidistantly in the circumferential direction. Three coil springs 39 are mounted to extend between the three engaging pins 37 and a fixed pin 38 provided in the center position of the lower stationary plate 17. The three coil springs 39 constitute the support returning device SF of the resiliently biasing type.

Action of the support returning device SF will be described.

First, the reference position for holding the movable portion is where an article A is not placed on the upper movable plate 24 and the resilient biasing forces in pulling directions of the three coil springs 39 are in a balanced state. In other words, this is a position where the annular rolling type support 14 is substantially concentric with a circle around the fixed pin 38. When an article A placed on the movable portion 10 moves horizontally to move the rolling type support 14 horizontally from the reference position for holding the movable portion, the resilient biasing forces of the three coil springs 39 lose the balance. Consequently, a restoring force acts in a direction to restore the balance, thereby returning the rolling type support 14 to the reference position for holding the movable portion.

A diameter D2 of the rolling part of the rolling type support 14 is set somewhat larger than a diameter D1 of the upper movable plate 24 of the movable portion 10. Thus, even when an article A is placed with the bottom surface thereof inclined in an oblique direction to the upper movable plate 24, the movable portion 10 is not lifted to a large extent. The lift preventing plate 26 and upper stationary plate 19 has only a small vertical gap therebetween. This prevents, for example, exit of fine dust produced as a result of rolling action occurring between the stationary portion side contact surface forming member 22a and movable portion side contact surface forming member 22b, and the rolling elements 12.

Although not shown in detail, each of the six floating units 8 has the lower stationary plate 17 fixedly attached to the frame 42 as connected thereto with a plurality of bolts.

The takeout article storage unit 1a has positioning means IK for horizontally positioning an article A supported by the frames 42 through the plurality of floating units 8, to a reference position for transfer suitable for the processing equipment EQ to fetch the plate-like objects.

The positioning device IK is constructed to push on two places located on a diagonal line of the article A rectangular in plan view, placed in the takeout article storage unit 1a to position the article A to the reference position for transfer. To describe this further, a pair of moving control units 40 for positioning are arranged in positions corresponding to two locations on the pair of right and left frames 42 and on a diagonal line of the article A for pushing the article A in opposite directions along the diagonal line of the article A to position the article A in the reference position for transfer. These moving control units 40 constitute the positioning device IK.

The moving control units 40 are contained in the frames 42, except contact portions 41 for contacting the article A, FIG. 3 shows the moving control unit 40 located at the left-hand side with part of the casing 7 broken away, the moving control unit 40 located at the right-hand side as seen from above the casing 7.

Figure 9:
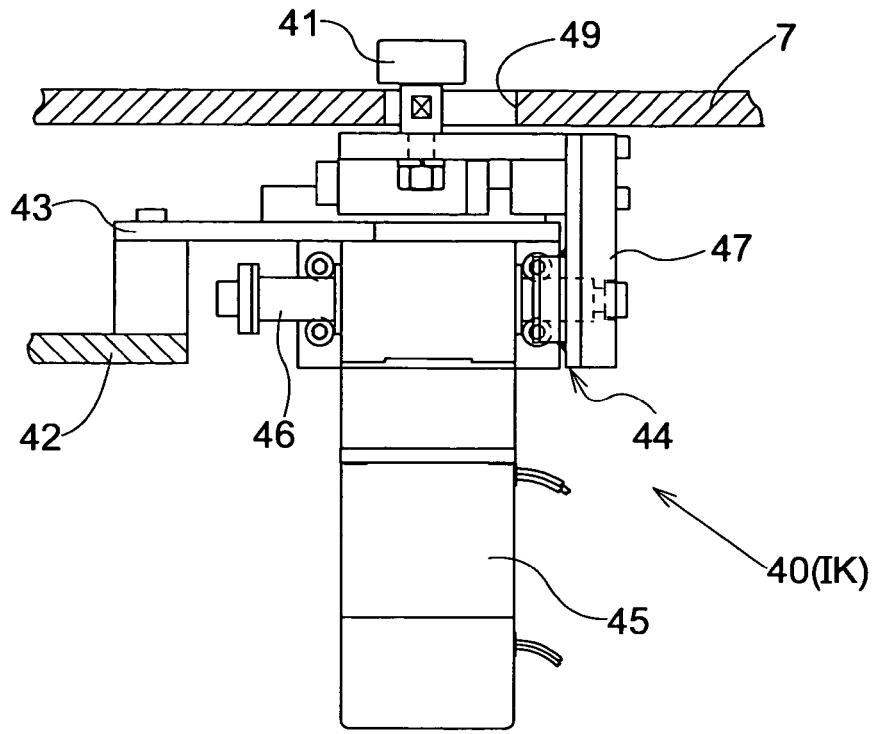
FIG. 9 is a side view of a moving control unit.
Figure 10:
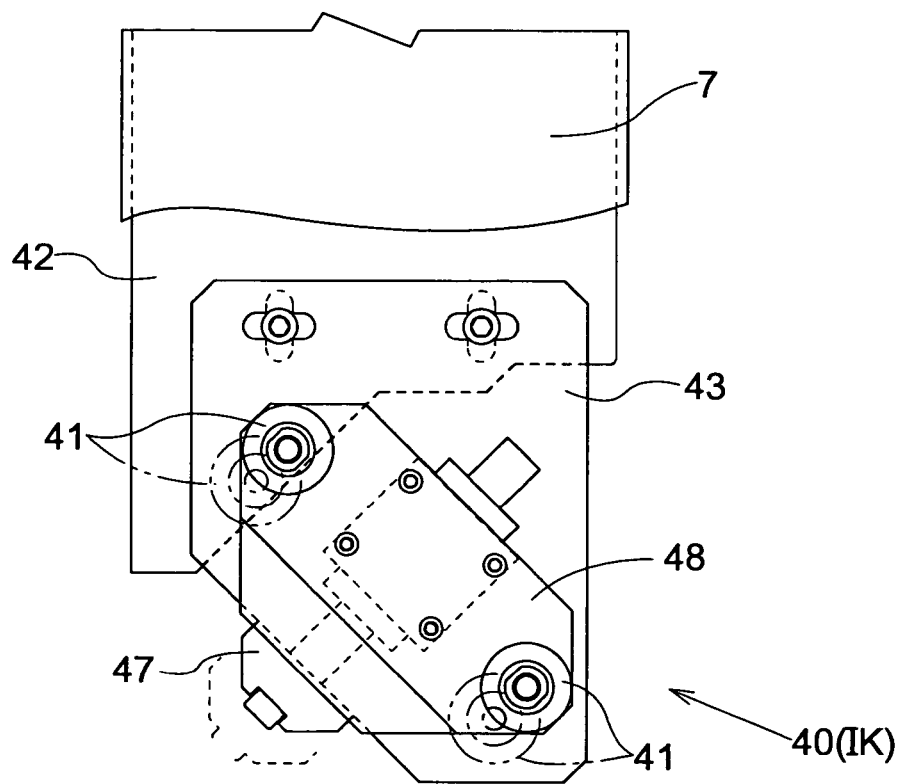
FIG. 10 is a plan view of the moving control unit.

The moving control units 40 have the same composition as shown in FIGS. 9 and 10. Specifically, each moving control unit 40 includes a support plate 43 fixedly attached to the frame 42, and a crossfeed mechanism 44 of the electric motor type attached to a lower part of the support plate 43. The crossfeed mechanism 44 of the electric motor type contains a screw feed mechanism (not shown) for converting the torque power of an electric motor 45 into a sliding force acting diagonally of the article A.

Figure 12:
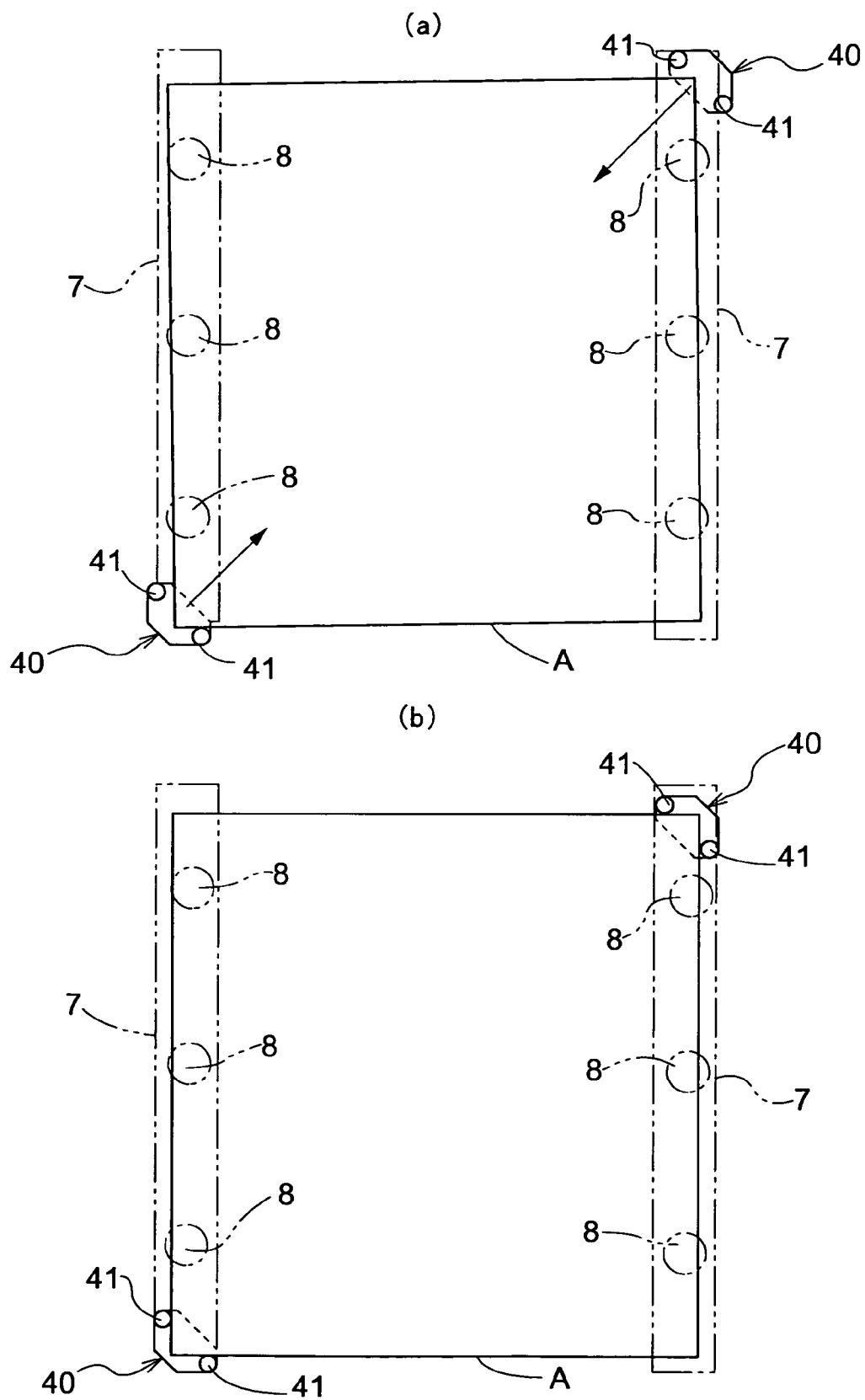
FIG. 12 is an explanatory view of operation of the moving control unit.

A slide shaft 46 is provided to be horizontally slidable by the sliding force of the crossfeed mechanism 44. A moving control plate 48 is rigidly connected the slide shaft 46 through a connecting member 47. The moving control plate 48 has a pair of contact portions 41 horizontally spaced apart by a predetermined interval. As shown in FIG. 9, these contact portions 41 project upward through slots 49 formed in the upper surface of the casing 7. When the slide shaft 46 is slid horizontally by the crossfeed mechanism 44, the pair of contact portions 41 contact the article A, and push the article A diagonally to a position corresponding to the reference position for transfer (see FIG. 12).

Operations of each component of the above automatic warehouse system will be described hereinafter. Such operations take place when the stacker crane 3 transports an article A to the takeout article storage unit 1a, when the processing equipment EQ fetches the plate-like objects, and when the stacker crane 3 transports the article A out of the takeout article storage unit 1a.

First, before the stacker crane 3 transports an article A to the takeout article storage unit 1a, each floating unit 8 has the movable portion 10 returned to the reference position for receiving an article by the action of the movable portion returning device KF, and the rolling type support 14 returned to the reference position for holding the movable portion by the action of the support returning device SF. The stacker crane 3 transports the article A to the takeout article storage unit 1a in such a state. Subsequently, a plate transfer device (not shown) of the processing equipment EQ may fetch part or all of the plate-like objects from the storage cassette. In order to allow for a smooth fetching operation of the processing equipment EQ, a positioning process is carried out to position the article A to the reference position for transfer suitable for the fetching operation. That is, each moving control unit 40 is operated to push the article A diagonally and set the article A to a proper position. When the article A is pushed by the operation of each moving control unit 40, the pushing force moves the movable portion 10 horizontally from the reference position for receiving an article as shown in FIG. 11. Since the rolling type support 14 bears the load of the article A at this time, the rolling type support 14 also moves from the reference position for holding the movable portion, through rolling of the rolling elements 12.

With each moving control unit 40 operated to position the article A, the plate transfer device of the processing equipment EQ fetches the plate-like objects. After the fetching of the plate-like objects is completed, the operation of each moving control unit 40 is stopped. At this time, the movable portion 10, which has moved horizontally from the reference position for receiving an article, with the article moved horizontally by the operation of the moving control units 40, is returned to the reference position for receiving an article by the action of the movable portion returning device KF.

The return control force applied to the movable portion 10 by the movable portion returning device KF, i.e. the resilient biasing force of the coil springs 33, is set strong enough to return the movable portion 10 to the reference position for receiving an article, against the load of the article A placed on the movable portion 10 and having a plurality of plate-like objects contained in the storage cassette.

As noted above, when the article A is moved horizontally by the operation of each moving control unit 40, and the movable portion 10 moves horizontally from the reference position for receiving an article as shown in FIG. 11, the rolling type support 14 also moves from the reference position for holding the movable portion, through rolling of the rolling elements 12. When the operation of each moving control unit 40 is stopped, the movable portion 10 returns to the reference position for receiving an article. This is accompanied by the operation of the support returning device SF to return the rolling type support 14 to the reference position for holding the movable portion.

When the plate-like objects have been taken out of the storage cassette, the article A becomes lighter by a weight corresponding to the objects taken out, Then, when the resilient biasing force of the coil springs 33 causes a return movement, the movable portion 10 is moved to the reference position for receiving an article by a force increased by an amount corresponding to the load reduction. The movable portion 10 may overshoot the reference position for receiving an article, and then again overshoot the reference position when returning in the opposite direction from a position beyond the reference position. In such repeated overshooting, the movable portion 10 tends to shake back and forth horizontally. Also when the rolling type support 14 is returned to the reference position for holding the movable portion by the resilient biasing force of the coil springs 39, there is a possibility of vibration through horizontally reciprocating movement as in the case of the movable portion 10, However, because of a difference in resilient biasing force between the coil springs 33 and coil springs 39 and a difference in weight between the movable portion 10 and rolling type support 14, a frequency of vibration caused by the coil springs 33 is different from that caused by the coil springs 39. This different allows the movable portion 10 to settle quickly in the reference position for receiving an article.

Subsequently, the stacker crane 3 may transfer the article A from the takeout article storage unit 1a to another article storage unit 1, or deliver the article A to an article reception and delivery unit 4. When all the plate-like objects have been taken out by the processing equipment EQ, the article A has only the storage cassette empty of plate-like objects. Such an article A is moved to another article storage unit 1.

When transferring the article A from the takeout article storage unit 1, the stacker crane 3 has a minimal waiting time since the movable portion 10 can settle quickly in the reference position for receiving an article as described above.

When the processing equipment EQ is to return the taken-out plate-like objects, after processing them, to a storage cassette, an article stored in a different article storage unit 1 and having only an empty storage cassette is transported to the takeout article storage unit 1a. The article is positioned by the positioning device IK, and then the plate-like objects are returned to the storage cassette. Subsequently the positioning action of the positioning device IK is canceled. In this case, when the movable portion 10 is returned to the reference position for receiving an article by the action of the movable portion returning device KF, the article A having a plurality of plate-like objects stored in the storing cassette has an increased weight. Thus, the return control force applied to the movable portion 10 by the movable portion returning device KF, i.e. the resilient biasing force of the coil springs 33, is set strong enough to return the movable portion 10 to the reference position for receiving an article, against the load of the article A placed on the movable portion 10 and having the plurality of plate-like objects stored in the storage cassette.

The support returning device SF includes three coil springs 39. The number of coil springs is not limited to three, but may be four or more. The number of springs is not limitative. Its construction will serve the purpose as long as the rolling type support 14 is returned to the reference position for holding the movable portion.

Second Embodiment

Next, floating units 8 in a second embodiment of this invention will be described.

The second embodiment differs from the first embodiment in that the movable portion returning device KF for horizontally moving the movable portion 10 relative to the stationary portion 11, back to the reference position for receiving an article, uses the magnetic attraction of permanent magnets, and that the support returning device SF for horizontally moving the rolling type support 14 relative to the stationary portion 11, back to the reference position for holding the movable portion 10, uses a plurality of coil springs that push the rolling type support 14 at outer peripheries thereof. Further, the upper movable plate 24 is integrated with the small diameter plate 24.

The second embodiment will be described, with like reference numbers affixed to like components which are the same as in the first embodiment.

In this embodiment, the movable portion returning device KF is the magnetic type for biasing the movable portion 10 by magnetic attraction, and the support returning device SF is the resiliently biasing type.

Figure 13:
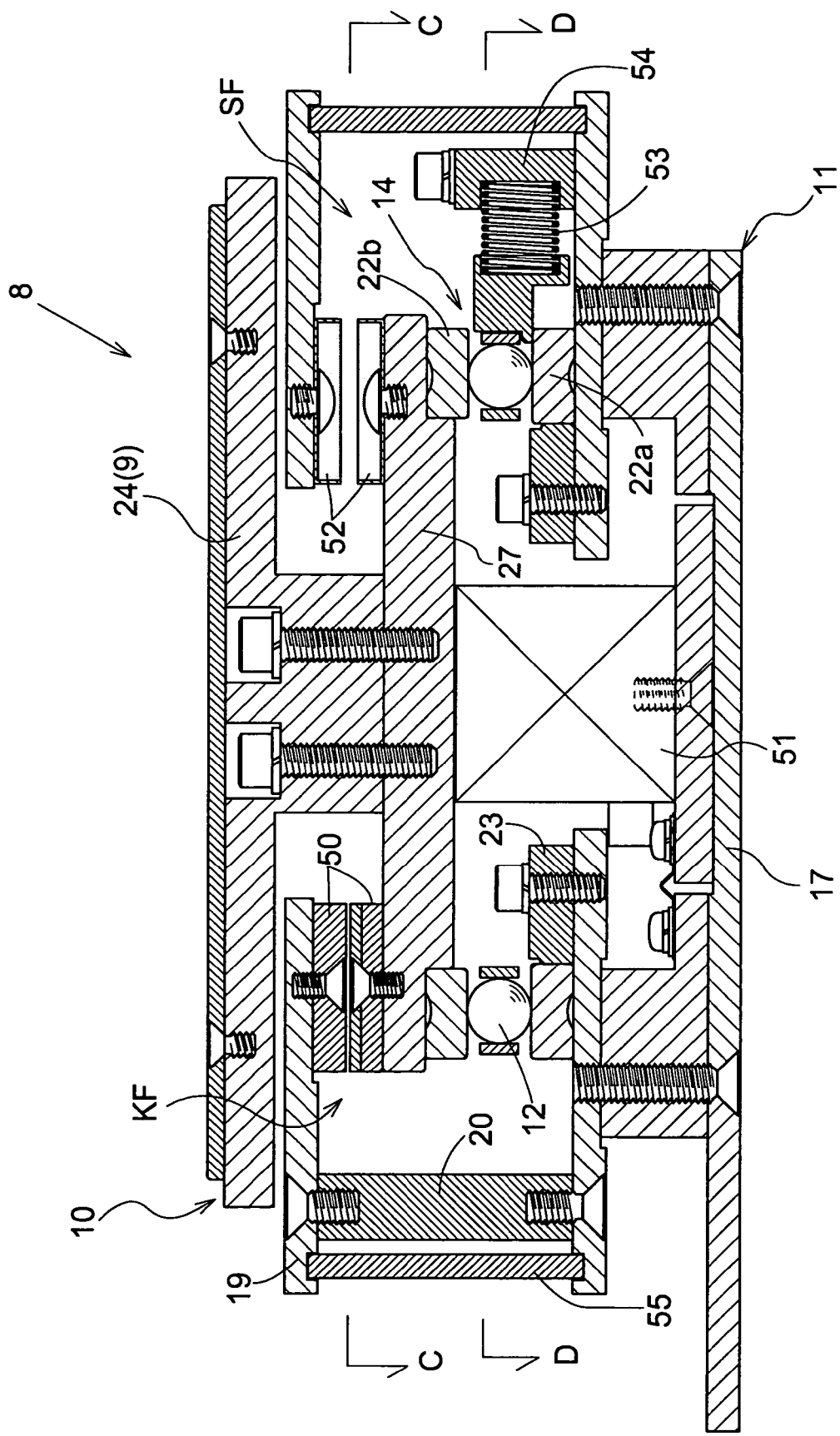
FIG. 13 is a side view in vertical section of a floating unit in another embodiment.
Figure 14:
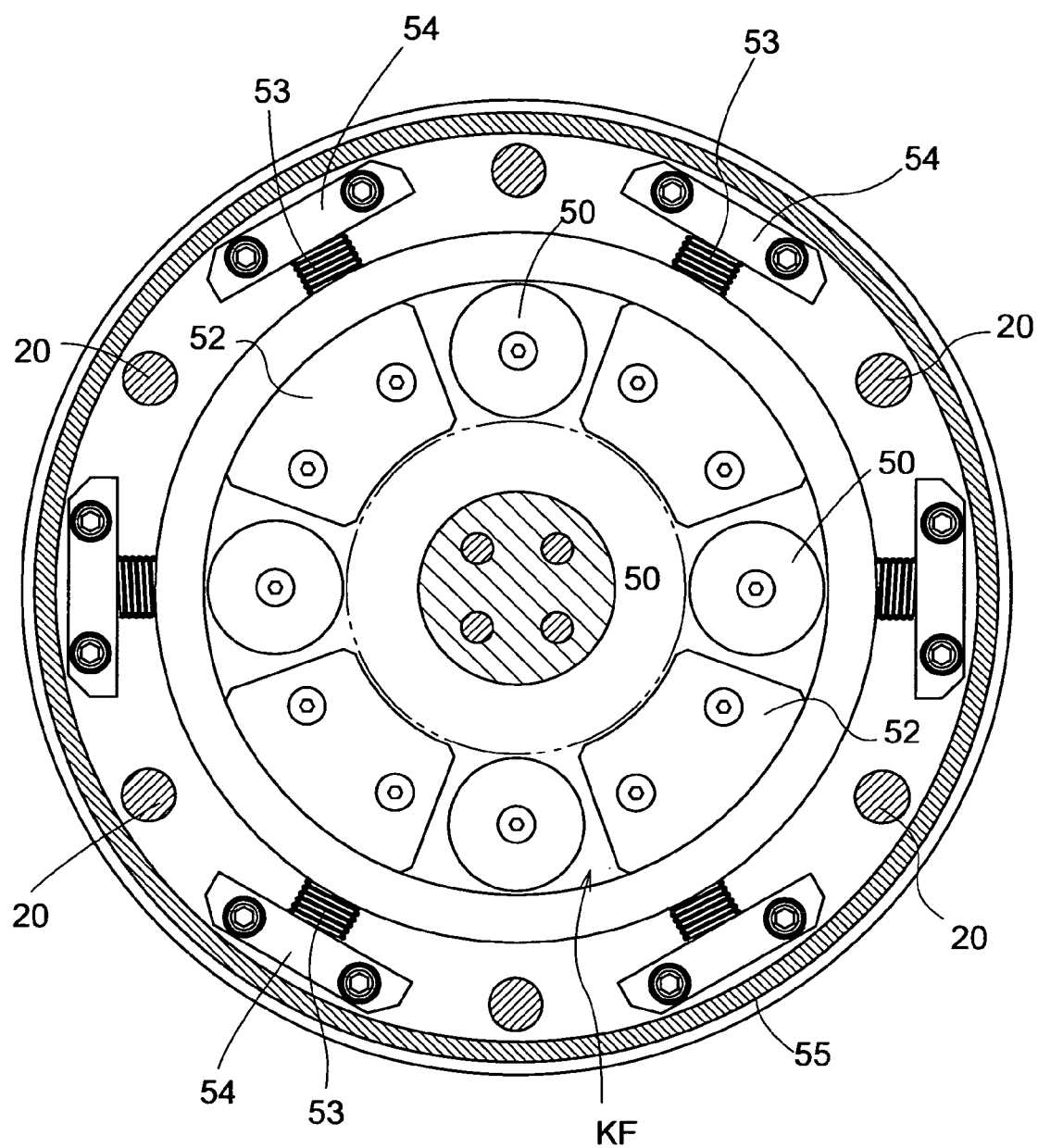
FIG. 14 is a section taken on line C-C of FIG. 13.

That is, in this embodiment, as shown in FIGS. 13 and 14, the circular lift preventing plate 27 of the movable portion 10 and the upper stationary plate 19 of the stationary portion 11 each have four permanent magnets 50 arranged in opposite positions and equidistantly in the circumferential direction of the lift preventing plate 27. The movable portion 10 is returned to the reference position for receiving an article by the magnetic attraction of these permanent magnets 50. Although the permanent magnets are arranged on the opposed surfaces of the lift preventing plate 27 and upper stationary plate 19, either one of the plates 27 and 19 may have permanent magnets while the other has a mere ferromagnetic material such as iron.

Thus, the movable portion returning device KF is formed of the four permanent magnets 50 arranged on each of the movable portion 10 and stationary portion 11. With this construction, the sets of four permanent magnets 50 are drawn closest to each other by magnetic attraction. That is, the four permanent magnets 50 on the movable portion and the four permanent magnets 50 on the stationary portion are biased to the same, mutually overlapping positions in plan view. The state where the four permanent magnets 50 on the movable portion and the four permanent magnets 50 on the stationary portion are in the same, mutually overlapping positions in plan view is a position corresponding to the particular rotational phase in the direction of rotation in plan view.

With this construction, when the movable portion 10 has moved horizontally, e.g. has rotated from the particular rotational phase in plan view relative to the stationary portion 11, the movable portion 10 is rotated back to the particular rotational phase by the magnetic attraction between the sets of four permanent magnets 50 to return to the reference position for receiving an article.

When an article A is moved by operation of the positioning device IK described in the first embodiment, the movable portion 10 may move horizontally from the reference position for receiving an article relative to the stationary portion 11. An electromagnet 51 is provided as a retaining device for retaining the movable portion 10 in a position to which it has moved, against the returning force of the movable portion returning device KF, after the operation of the positioning device IK is stopped. The rolling operation of the rolling type support 14 is the same as in the first embodiment.

The electromagnet 51 serves to attract, with a strong force, the lift preventing plate 27 formed of a ferromagnetic material such as iron, for example, to retain the movable portion 10 in a proper position on behalf of the positioning device IK when the positioning device IK in operation would interfere with an operation to fetch the plate-like objects or to transfer the article. Numeral 52 in the figures denotes contacting restrictors for preventing the movable portion 10 from being lifted in an oblique direction when the bottom of an article A is placed in a slanting position on the upper movable plate 24.

An article support apparatus equipped with the floating units in this embodiment may be provided for part of the plurality of article storage units 1, for example, as replacement for the article reception and delivery units 4 of the storage racks 2A and 2B in the first embodiment, This article storage unit 1 may be used to receive articles from and deliver articles to an external transport device, with the stacker crane 3 transporting these articles to and from the other article storage units.

That is, after the external transport device carries an article into the above article storage unit 1, the positioning device IK moves the article to a reference position for transfer by the stacker crane 3. The movable portion 10 is retained in the proper position by the attracting action of the electromagnet 51. Subsequently, the positioning action of the positioning device IK is canceled, and the stacker crane 3 transports the article. With the article A removed from the floating unit, the attracting action of the electromagnet 51 is stopped for allowing the movable portion 10 to return to the reference position for receiving an article.

When performing the transporting operation with the stacker crane 3, the article A is removed from the floating unit and the attracting action of the electromagnet 51 is stopped. Then, the movable portion returning device KF returns the movable portion 10, by magnetic attraction, to the reference position for receiving an article. When the movable portion 10 has rotated from the particular rotational phase in plan view then, the movable portion 10 is rotated back to the particular rotational phase by magnetic attraction between the sets of four permanent magnets 50.

Figure 15:
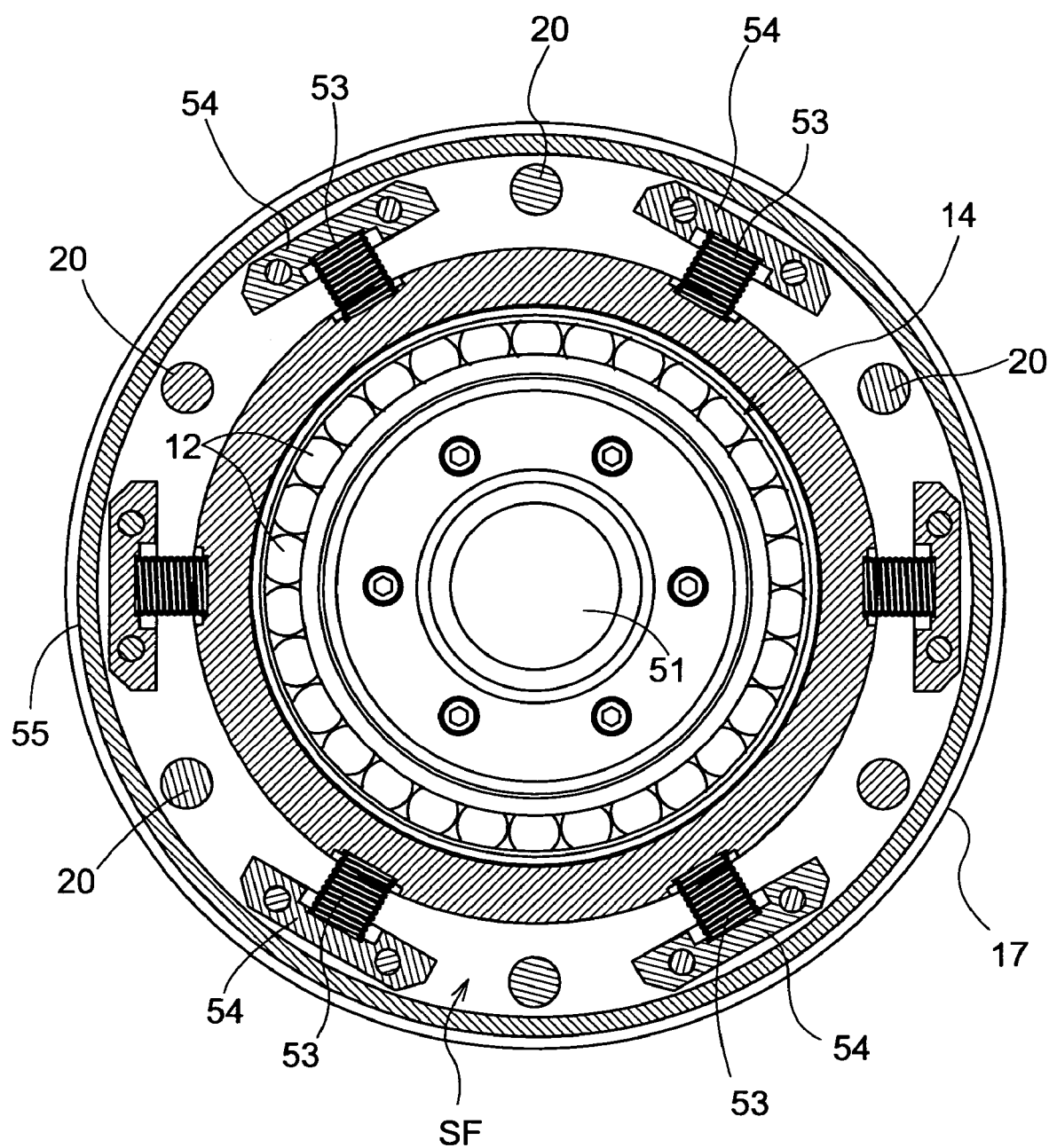
FIG. 15 is a section taken on line D-D of FIG. 13.

In order to attract the movable portion 10 efficiently, the electromagnet 51 is fixed to the lower stationary plate 17 and adjacent the center of the disk-shaped lift preventing plate 27, The support returning device cannot be provided radially inwardly of the annular rolling type support 14. Therefore, as shown in FIG. 15, six push type coil springs 53 are arranged radially outwardly of the annular rolling type support 14 and equidistantly in the circumferential direction thereof. The coil springs 53 have radially outward ends thereof received by spring stops 54 fixed to the stationary portion 11. Thus, the rolling type support 14 is pushed radially inward to return to the reference position for holding the movable portion.

That is, the coil springs 53 are installed as compressed from free state, and have resilient biasing forces acting in the direction of elongation. The pressing forces of the six coil springs 53 return the rolling type support 14 to the reference position for holding the movable portion. Thus, in this embodiment, the support returning device SF is formed of the six push type coil springs 53. Further, in this embodiment, the movable portion accommodating space is surrounded by a cylindrical cover 55.

As described above, six push type coil springs 53 are arranged equidistantly in the circumferential direction to push the rolling type support 14 radially inward. When the movable portion 10 is moved horizontally by action of the positioning device IK, the plurality of coil springs 53 compressed by the movement may have different resilient biasing forces. The different biasing forces of these coil springs 53 may result in a force for rotating the movable portion 10 in plan view to a rotational phase different from the particular rotational phase. However, when returning the movable portion 10 to the reference position for receiving an article, the sets of four permanent magnets 50 acting as the movable portion returning device KF, with the magnetic attraction therebetween, rotate the movable portion 10 back to the particular rotational phase. Thus, the movable portion 10 can be returned to the reference position for receiving an article very promptly.

As a result, the movable portion 10 with no article placed thereon may be returned promptly to the reference position for receiving an article, to stand still and be ready to receive an article. The external transport device can carry in a next article efficiently with little waiting time.

In this embodiment, the support returning device SF is formed of six push type coil springs 53. The number of coil springs 53 is not limited to six or any number, as long as three or more coil springs are arranged equidistantly. Its construction will serve the purpose as long as the rolling type support 14 is returned to the reference position for holding the movable portion. The number of permanent magnets 50 constituting the movable portion returning device KF is not limited to four each, but may be any plural number. It will serve the purpose only if capable of rotating the movable portion 10 back to the particular rotational phase.

Other Embodiments

Other embodiments are set out briefly below:

(1) In each embodiment described above, the support returning device SF is the resiliently biasing type using the resilient biasing force of coil springs. Instead, the resilient biasing force of rubber may be used.

The support returning device SF is not limited to such resilient biasing type, but may use magnetic attraction of permanent magnets or electromagnets for return movement. Various other forms may be employed. For example, actuators may be arranged horizontally outwardly of the rolling type support for pushing the support back to the reference position for holding the movable portion.

(2) In the first embodiment described above, the movable portion returning device is the resiliently biasing type using the resilient biasing force of coil springs. Instead, the resilient biasing force of rubber may be used. In the second embodiment, the movable portion returning device uses the magnetic attraction of permanent magnets for return movement. The permanent magnets may be replaced with electromagnets arranged on the stationary portion, and ferromagnetic elements arranged on the movable portion.

As the movable portion returning device, the resiliently biasing type as in the first embodiment or using magnetic attraction for return movement as in the second embodiment may be replaced with various other forms. For example, actuators may be arranged horizontally outwardly of the movable portion for pushing the movable portion back to the reference position.

(3) In the above embodiments, the positioning device includes the moving control units 40 arranged in positions corresponding to two locations on a diagonal line of an article for pushing the article in opposite directions along the diagonal line of the article. Instead of such a construction, a moving control unit 40 as noted above may be disposed in one of the two locations on a diagonal line of an article, and a fixed stopper disposed in the other location for simply receiving and supporting the article in a proper position.

The positioning device is not limited to the construction for pushing the article in opposite directions along a diagonal direction, but may be constructed to push the article sideways and fore and aft.

(4) In the above embodiments, the movable portion includes a plurality of plates and a plurality of posts rigidly connected together. Instead of such composition, for example, the movable portion may be formed of a single member, in which a support for supporting an article is supported at a lower surface thereof by the rolling type support. The stationary portion includes a plurality of plates and a plurality of posts rigidly connected together. Instead of such construction, the stationary portion may be formed of a single member.

(5) In the above embodiments, a pair of right and left elongate frames 42 for supporting an article are fixedly attached to the transverse frames 6 each extending between a pair of front and rear struts 5 arranged at one side, among the four struts 5 located in the four corners of a space where the article is stored in a storage rack. This construction may be replaced with the following construction.

For example, a plurality of brackets may be fixedly attached to each transverse frame 6 as arranged at suitable intervals longitudinally of the frame 6 for supporting the floating units 8. The right and left transverse frames 6 and the plurality of brackets attached thereto constitute the pair of right and left elongate frames.

(6) In the above embodiments, the article support apparatus has a plurality of floating units in part of the article storage units arranged vertically and horizontally in each storage rack. The apparatus may include only one article storage unit, with the floating units arranged in this storage unit. Thus, the article storage unit may be varied as appropriate.

(7) In the above embodiments, each article transported includes a storage cassette containing a plurality of plate-like objects such as liquid crystal displays or materials (glass plates) used therefor. For example, each article transported may have a storage cassette containing a plurality of printed circuit boards. Further, the construction for containing a plurality of plate-like objects is not limitative, but any type of article may be handled.

(8) The rolling elements used may be shaped otherwise than spherical. For example, the rolling type support 14 may have a plurality of cylindrical rolling elements. Adjacent rolling elements may have axes of the cylinder extending in different directions, such as perpendicular, to facilitate linear movement of the movable portion.

What is claimed is:

1. A floating unit comprising:
   a stationary portion;
   a movable portion supported to be movable relative to said stationary portion and including an article support;
   a support disposed between said stationary portion and said movable portion, said support having a plurality of rolling elements rotatably held by a holder between an upwardly facing first contact surface provided on said stationary portion and a downwardly facing second contact surface provided on said movable portion, whereby said support is movable in all horizontal directions relative to said movable portion and to said stationary portion;
   movable portion returning means for biasing said movable portion relative to said stationary portion toward a reference position for receiving an article; and
   a plurality of resilient elements for biasing said support horizontally relative to said stationary portion toward a reference position for holding said movable portion.

2. A floating unit as defined in claim 1 wherein said movable portion returning means has a plurality of resilient elements.

3. A floating unit as defined in claim 1 wherein said movable portion returning means biases said movable portion by magnetic attraction.

4. A floating unit as defined in claim 1, further comprising a retaining device for retaining said movable portion having moved horizontally relative to said stationary portion from said reference position for receiving an article, against a return biasing force of said movable portion returning means.

5. A floating unit as defined in claim 1, wherein:
   said movable portion is supported by said support to be rotatable in plan view relative to said stationary portion; and said movable portion returning means is adapted to rotate said movable portion back to a particular rotational phase in a rotational direction in plan view.

6. An article support apparatus having floating units as defined in claim 1, said apparatus comprising:
a pair of frames arranged to extend substantially parallel for receiving and supporting an article, each of said frames having a plurality of said floating units arranged longitudinally thereof; and
positioning means for moving the article supported by the plurality of floating units arranged on each of said pair of frames, horizontally to a reference position for transfer.

7. An article support apparatus as defined in claim 6, wherein said pair of frames and said positioning means are provided to some of a plurality of article storage units arranged vertically and horizontally in a storage rack.

8. A floating unit as defined in claim 1, wherein said support returning means includes a plurality of springs acting as said resilient elements and extending between a member fixed to said stationary portion and connecting members integral or in contact with said holder.

9. A floating unit as defined in claim 8, wherein said holder is generally annular, and said member fixed to said stationary portion is located radially inwardly of said holder.

10. A floating unit as defined in claim 8, wherein said holder is generally annular, and said member fixed to said stationary portion is located radially outwardly of said holder, and includes spring stops corresponding to said plurality of springs.

11. A floating unit as defined in claim 1, further comprising a restricting means disposed between said movable portion and said fixed portion for restricting horizontal movement of said movable portion relative to said fixed portion.

12. A floating unit as defined in claim 1, wherein:
said stationary portion has a lower stationary plate, an upper stationary plate vertically spaced apart from said lower stationary plate, and a cover depending downwardly from said upper stationary plate; and
said movable portion has a first member disposed in a space at least partly defined by said lower stationary plate, said upper stationary plate and said cover, said article support of said movable portion being connected to the first member by a second member extending through a bore formed in said upper stationary plate of said stationary portion, and disposed above said upper stationary plate.

13. A floating unit as defined in claim 12, wherein said first member includes a lift preventing plate large enough to close said bore formed in said upper stationary plate.

14. A floating unit comprising:
a stationary portion having a lower stationary plate, an upper stationary plate vertically spaced from said lower stationary plate and defining a bore, and a cover depending downwardly from said upper stationary plate;
a movable portion supported to be movable relative to said stationary portion and including an article support, said movable portion having a first member disposed in a space at least partly defined by said lower stationary plate, said upper stationary plate and said cover, said article support being connected to said first member by a second member at least partly extending through said bore of said upper stationary plate, and disposed above said upper stationary plate;
a support having a plurality of balls for movably supporting said movable portion;
first biasing means for biasing said movable portion relative to said stationary portion toward a first reference position; and
second biasing means for biasing said support relative to said stationary portion toward a second reference position.

15. A floating unit as defined in claim 14, wherein said first member includes a lift preventing plate large enough to close said bore formed in said upper stationary plate.

16. A floating unit as defined in claim 15, wherein:
said movable portion has a lower movable plate supported by said support below said lift preventing plate and connected to said lift preventing plate by a plurality of movable portion side posts;
said fixed member has a plurality of stationary portion side posts fixed to said lower stationary plate and extending upward; and
said first biasing means has a plurality of springs extending between said movable portion side posts and said stationary portion side posts.

17. A floating unit as defined in claim 15, wherein first biasing means includes a first group of members with magnetic property arranged on a lower surface of said upper stationary plate, and a second group of members with magnetic property in attractive interaction with the first group of members with magnetic property, arranged on an upper surface of said lift preventing plate.

18. A floating unit as defined in claim 14, wherein:
said support defines an inner space; and
said second biasing means has a plurality of springs arranged in said inner space of said support, and each applying a biasing force at one end thereof to said support.

19. A floating unit as defined in claim 14, wherein said second biasing means has a plurality of springs arranged outside said support, and each applying a biasing force at one end thereof to said support.

20. A floating unit as defined in claim 19, further comprising retaining means disposed inwardly of said support for retaining said movable portion having moved horizontally relative to said stationary portion from said first reference position, against a biasing force of said first biasing means.

* * * * *

UNITED STATES PATENT AND TRADEMARK OFFICE
CERTIFICATE OF CORRECTION

PATENT NO.        : 7,651,309 B2                                         Page 1 of 1
APPLICATION NO.   : 11/503510
DATED             : January 26, 2010
INVENTOR(S)       : Ikehata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 838 days.

Signed and Sealed this

Twenty-third Day of November, 2010

David J. Kappos
*Director of the United States Patent and Trademark Office*